United States Patent [19]

Haefner

[11] Patent Number: 5,025,654
[45] Date of Patent: Jun. 25, 1991

[54] PRESSURE STANDARD DEVICE

[75] Inventor: Hans W. Haefner, Aichach-Walchshofen, Fed. Rep. of Germany

[73] Assignee: Pfister GmbH, Augsburg, Fed. Rep. of Germany

[21] Appl. No.: 427,139

[22] PCT Filed: May 7, 1988

[86] PCT No.: PCT/DE88/00276
§ 371 Date: Oct. 23, 1989
§ 102(e) Date: Oct. 23, 1989

[87] PCT Pub. No.: WO88/08966
PCT Pub. Date: Nov. 17, 1988

[30] Foreign Application Priority Data

May 8, 1987 [DE] Fed. Rep. of Germany ....... 3715450

[51] Int. Cl.$^5$ .............................................. G01L 27/00
[52] U.S. Cl. ...................................................... 73/4 D
[58] Field of Search .......................... 73/4 R, 4 D, 4 V

[56] References Cited

U.S. PATENT DOCUMENTS

| | | | |
|---|---|---|---|
| 2,796,229 | 6/1957 | Newhall | 73/4 D UX |
| 3,407,644 | 10/1968 | Yasunami | 73/4 D |
| 3,633,402 | 1/1972 | Miller, III et al. | 73/4 D |
| 4,491,016 | 1/1985 | Haefner | 73/745 X |
| 4,711,127 | 12/1987 | Hafner | 73/744 X |
| 4,798,094 | 1/1989 | Newhall et al. | 73/1 B X |

FOREIGN PATENT DOCUMENTS

| | | |
|---|---|---|
| 2323019 | 11/1974 | Fed. Rep. of Germany . |
| 242074 | 10/1979 | France . |
| 680856 | 6/1965 | Italy .................... 73/4 D |
| 845030 | 7/1981 | U.S.S.R. ............... 73/4 R |
| 972288 | 11/1982 | U.S.S.R. ............... 73/4 R |
| 1008633 | 3/1983 | U.S.S.R. ............... 73/4 R |
| 2056098A | 3/1981 | United Kingdom . |
| 2176007 | 12/1986 | United Kingdom ... 73/4 R |

OTHER PUBLICATIONS

"Messen, Steuern und Regeln in der Chemischen Technik", pp. 112–117 (1980).

Primary Examiner—Tom Noland
Attorney, Agent, or Firm—Armstrong, Nikaido, Marmelstein, Kubovcik & Murray

[57] ABSTRACT

The present invention embodies a calibration/testing device having a housing having a generally cylindrical recess, a piston guided within the recess via a hydrostatic/aerostatic bearing, a pressure chamber formed between the piston and the cylindrical recess, a conduit connected to the pressure chamber for transmitting an exact pressure prevailing in the chamber, and a regulating device for maintaining the piston in a precisely constant position with respect to height independent of varying the load on the piston. The constant position is maintained by the feeding or discharging of fluid to and from the pressure chamber. The pressure within the pressure chamber is defined by loading the piston with calibration weights. The present invention offers the advantage of a comparatively simple structure, while maintaining a high level of accuracy.

23 Claims, 2 Drawing Sheets

PRESSURE STANDARD DEVICE

BACKGROUND OF THE INVENTION

The invention relates to a pressure standard device as set forth in the classifying portion of the claim.

The book "Messen, Steuern und Regeln in der chemischen Technik", edited by J. Hengstenberg, B. Sturm, O. Winkler, third edition, volume I, pages 112 to 117, Berlin 1980, discloses piston manometers in which a cylindrical piston engages through an opening into a closed oil-filled cylinder to which the pressure p is applied by way of a further opening. The vertically directed piston is loaded with weights. Problems arise in that arrangement with regard to sealing of the piston in the opening so that no friction may occur and at the same time no fluid can to escape. The piston is therefore usually caused to rotate prior to the pressure being applied, and that reduces the level of friction. The friction between the piston and the cylinder can be further reduced by air or fluid being radially introduced under pressure into the clearance. A further problem arises when measuring pressure in gases when making the transition from the fluid to the gas, in which respect special precautions must be taken if the gas involved is not an inert gas. Even then making the transition from the fluid to the gas gives rise to problems as the position in respect to the height of the piston in the cylinder is not defined. It is therefore necessary to provide stops with relation to excessive movement of the piston both in an upward direction and in a downward direction.

German laid-open application (DE-OS) No. 35 14 911 describes another pressure measuring device for measuring a pressure applied to a piston by way of a gaseous medium, wherein the piston is guided in a cylinder in a practically friction-free manner in bearings by virtue of the fact that the bearings are supplied with a fluid under pressure, the piston acting on a force-measuring means. The bearing fluid which escapes into the cylinder chamber containing the gas is removed in a regulated manner in that arrangement. In an alternative embodiment, a gas under pressure is supplied to the bearings, while bearing gas which issues into the cylinder chamber can be used for building up the pressure in a conduit which is connected to the cylinder chamber. As the force-measuring means operates practically without performing any travel movement, practically no movement of the piston also occurs and the position of the piston plays no part.

The GB-A-2056098 discloses a standardized pressure instrument comprising a cylinder and a piston guided therein the height position thereof having to be maintained constant irrespective of a varying loading of the piston in order to prevent a contact to the cylinder. In the lower region of the cylinder a pressure space is formed being connected to a pressurized fluid via a duct and by loading of the piston with a calibration mass the pressure in the pressure space may be determined. A constant height of zero position, respectively, of the piston is determined by an indicating device and is maintained by supplying fluid to the pressure space.

However, the guidance of the piston by means of upper and lower diaphragms having the piston tightly clamped therebetween is disadvantageous. In view of this type of support the readings are falsified due to the deformation resistance of the diaphragms and deteriorate the measuring accuracy of the force measuring device. In view of the diaphragms fixedly clamping the piston the latter may move minimal only such that the height regulation for maintaining a predetermined height position must be designed extremely accurate. Furthermore, the expenditures for these diaphragms are considerable.

SUMMARY OF THE INVENTION

The invention is based on the object of providing a calibration/testing device, the structure of which is considerably simplified, while maintaining a high level of accuracy, in comparison with known devices.

In accordance with the invention that object is attained by a calibration/testing device comprising a housing having a generally cylindrical recess, a piston guided within the recess via hydrostatic/aerostatic bearing means, a pressure chamber formed between the piston and the cylindrical recess, a conduit connected to the pressure chamber for transmitting an exact pressure prevailing in the chamber, and a regulating device for maintaining the piston in a precisely constant position with respect to height independent of varying the load on the piston. The constant position is maintained by the feeding or discharging of fluid to and from the pressure chamber. The pressure within the pressure chamber is defined by loading the piston with calibration weights.

Preferred developments of the device according to the invention are characterised in the subsidiary claims.

The hydrostatic or aerostatic bearing arrangement for the piston in the cylinder is practically friction-less so that there is no need for rotary movement of the piston. It is possible to use a liquid as the bearing fluid, by virtue of the regulated discharge thereof. The arrangement is a particularly simple one when the bearing fluid is used to build up the pressure. The level regulation effect which is used in the invention provides for an exact position in respect of height of the piston in the cylinder so that it does not bear against the end of the cylinder nor can it be displaced upwardly out of its bearings.

BRIEF DESCRIPTION OF THE DRAWINGS

Further features and advantages of the calibration/testing device according to the invention will be apparent from the description of the specific embodiments with reference to the following drawing wherein.

DETAILED DESCRIPTION OF THE PREFERRED EMBODIMENTS

Figure 1:
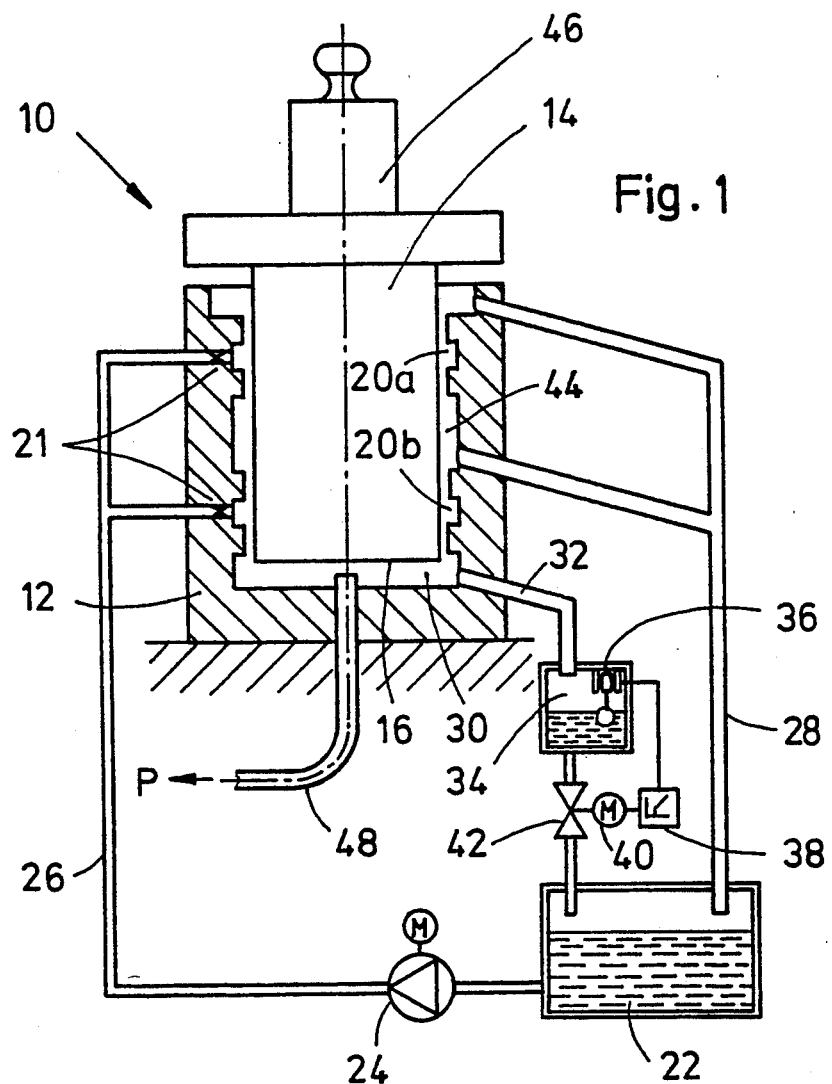
FIG. 1 is a partial sectional view illustrating the principle of a gas pressure standard device.

FIG. 1 shows a gas pressure standard device 10 in accordance with a first embodiment of the invention comprising a cylinder 12 which is supported on a base surface and in which a piston 14 is guided in a practically friction-less manner. The piston 14 can be loaded with a calibration weight 46. Formed in the interior of the cylinder 12 is a pressure chamber 30 which is filled with gas, in particular air, and which by way of a conduit 48 applies a pressure p to a piece of equipment which is to be calibrated or tested, for example a pressure measuring cell (see FIGS. 2 and 3). The pressure is essentially determined by the calibration weight 46 and the area of the lower end face 16 of the piston 14.

The piston 14 is guided in the cylinder 12 in a practically friction-less manner by way of hydrostatic bearings 20, as are known for example from German laid-open applications (DE-OS) Nos. 31 43 919 or 35 14 911. For that purpose, a bearing liquid, for example an oil, is supplied under pressure from a closed tank 22 by way of a pump 24 and a feed conduit 26. A part of the bearing liquid accumulates in pockets 44. However bearing liquid also passes into the pressure chamber 30 which is beneath the piston surface 16 and which with the passage of time would be filled up with the bearing liquid, which would lead to the measurement result being adversely affected. The arrangement therefore provides for a controlled return of that bearing liquid from the pressure chamber 30. For that purpose a conduit 32 leads from the pressure chamber 30 into a closed catch tank 34 which is thus under the same pressure as the pressure chamber 30. The amount of bearing liquid in the tank 34 is now held constant at a predetermined level. For that purpose, the tank has a level-detecting device 36 which can be, for example, in the form of a float, whose position is preferably optically or electrically detected. When a given level is exceeded, a regulating device 38 is activated, which opens an emptying valve 42, preferably by way of a motor 40, until the level of bearing liquid has fallen again below the reference level. The bearing liquid flows back into the tank 22, thus providing a closed system in which there is no need for refilling it with bearing liquid.

By virtue of the regulated discharge of bearing liquid from the pressure chamber 30, the volume which is under pressure does not change. Thus, the arrangement provides a high degree of accuracy. It should be noted that the conduit 48 projects somewhat beyond the bottom end of the cylinder 12 so that no bearing liquid can penetrate into the conduit 48.

By virtue of different calibration weights 46 being put onto the device, exactly defined pressures are produced and applied to the test item, for example a pressure-measuring cell, the display values of which then serve to plot the usual calibration or test curve.

As the principle of the device according to the invention has been described with reference to FIG. 1, reference will now be directed to FIG. 2 which is a diagrammatic view of an embodiment of a calibration/testing device 50 according to the invention, which approximates to a practical construction. The elements already described with reference to FIG. 1 are denoted by the same reference numerals and will not be described in greater detail in this context.

Figure 2:
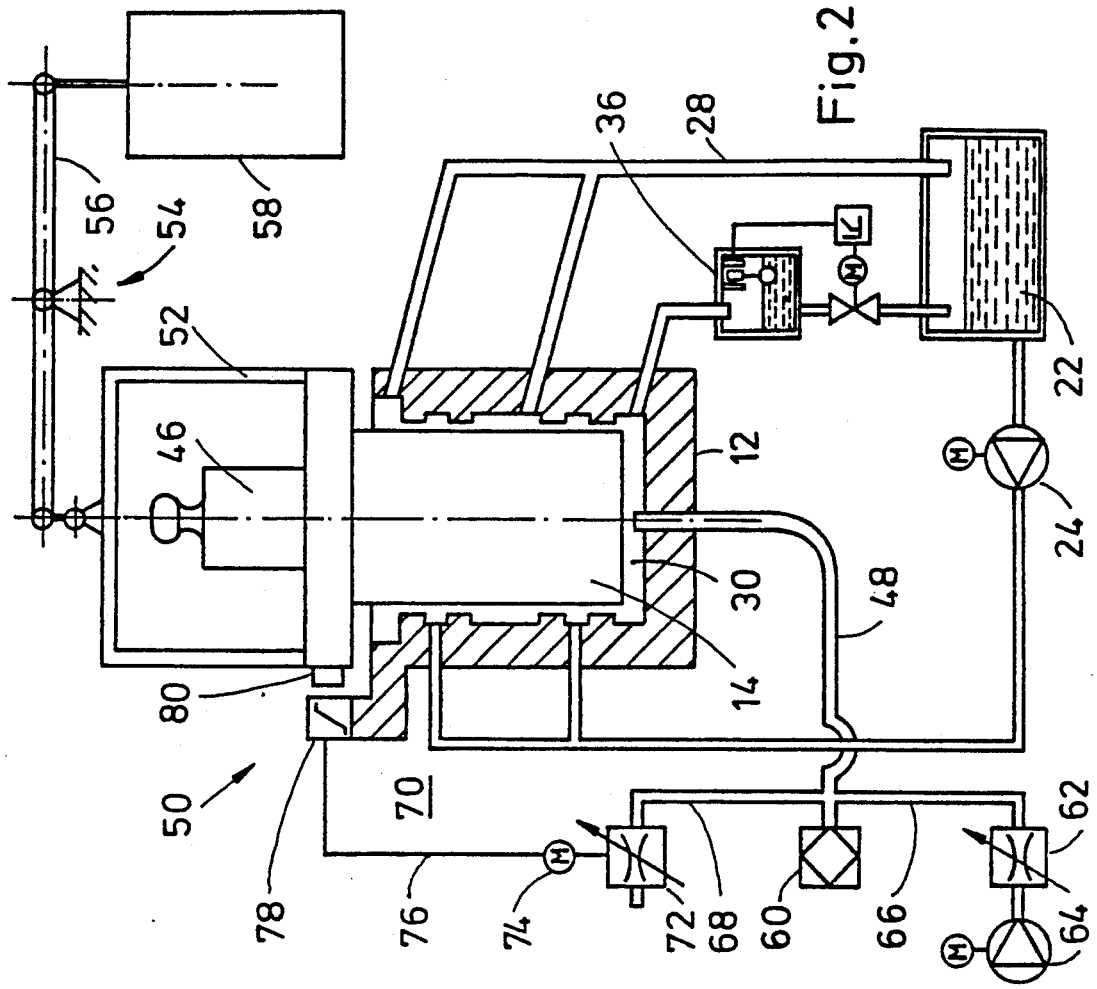
FIG. 2 is a practical embodiment of a gas pressure standard device based on the embodiment shown in FIG. 1.

In addition to the embodiment shown in FIG. 1, the calibration or testing device shown in FIG. 2 has on the one hand a weight compensating means 54 and on the other hand a position regulating means 70.

The compensating means 54 serves in particular to compensate for the weight of the piston 14. Although various devices can be considered for that purpose, the construction which has been selected as an example thereof comprises a two-armed lever 56 which is mounted at a stationary location and which at its one end is pivotally connected to the piston 14 by way of a generally U-shaped member 52 while disposed at its other end is a compensating weight 58 which, in the absence of a calibration weight 46, precisely produces a condition of equilibrium.

FIG. 2 also shows the pressure-measuring cell 60 which is to be calibrated or tested and which is subjected with the pressure in the conduit 48. To provide a basic setting, gas, in particular air, can be supplied from a pump 64 which is driven for example by means of a motor M, until reaching a pressure which can be set by means of the adjusting member 62. Upon an increase in the magnitude of the calibration weights 46, the piston 14 would be urged into the cylinder 12 until finally it comes to bear against the connecting feed portion of the conduit 48. In order to prevent that from happening and in order to maintain the piston 14 in an exact position in the cylinder 12, provided at an upper edge of the piston 14 is a passive marking or an optical, magnetic or electrical sender 80 which is sensed by means of a sensor 78 which is mounted on a projection at the upper edge of the cylinder 12, in opposite relationship to the sender 80. The sensor 78 is provided with a regulating device which by way of an electric line 76 can actuate a motor 74 in one direction of rotation or the other, depending on whether the piston 14 is too high or too low. The motor 74 moves a control member 72 which supplies gas, in particular air, by way of a pressure conduit 68 to the conduit 48 until the piston 14 has reached its precise position, that is to say a zero position. In that way, upon an alteration in the calibration weight 46, the piston 14 is automatically adjusted again into the correct position.

It should be pointed out that an automatic regulating means 50 is shown in the illustrated embodiment. It is however also possible to provide for positioning adjustment of the piston 14 by manual actuation of the control member 72.

Figure 3:
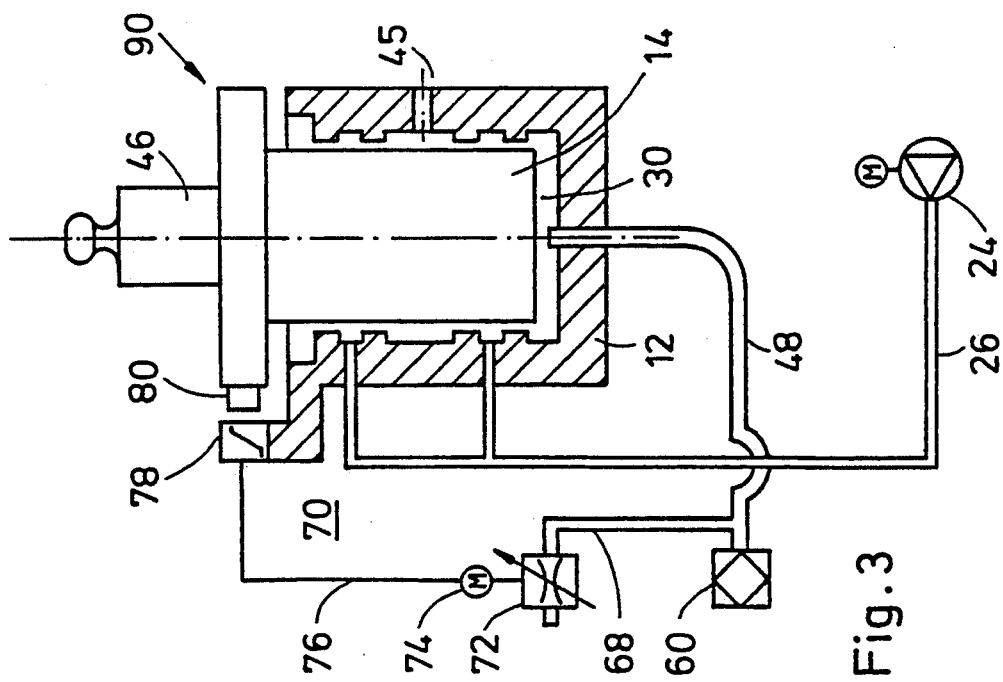
FIG. 3 is a particularly simplified construction of a further embodiment of a gas or liquid pressure standard device.

FIG. 3 shows a further embodiment of the invention which is of a particularly simple design configuration. This embodiment makes use of the basic concept that the bearing fluid to provide for hydrostatic or aerostatic support for the piston 14 in the cylinder 12 is used at the same time as a pressure medium. In this case the bearing fluid may be a gas or a liquid, gas having the advantage that it does not have an adverse chemical effect on the pressure-measuring cell 60.

As in this embodiment no bearing liquid has to be discharged in a regulated fashion, the components used for that purpose in FIGS. 1 and 2 are omitted, which makes the construction considerably simpler.

In this embodiment of a calibration or testing device 90, a given base pressure is applied to the bearing locations by way of the motor-driven pump 24. By virtue of the bearing fluid leaking through the hydrostatic or aerostatic bearings, the pressure chamber 30 is filled with bearing fluid so that finally a corresponding pressure is applied by way of the conduit 48 to the test item, in particular the pressure-measuring cell 60.

Precise positioning of the piston 14 is again achieved by way of the regulating means 70.

It should be pointed out that this embodiment can also use a weight compensating means 54 as shown in FIG. 2.

Finally it should be pointed out that it is not sufficient for air to be injected under pressure into a smooth oil bearing in order to prevent contact between the piston and the cylinder wall or the opening thereof. Just a minor asymmetry in respect of a calibration weight 46 which is put onto the device can result in the piston bearing against the cylinder wall.

As FIGS. 1 through 3 show, the hydrostatic or aerostatic bearing arrangement according to the invention comprises two spaced-apart bearing rings 20a and 20b, between which there is an annular pocket 44 which is pressure-free, for example by virtue of a bore 45 (see FIG. 3).

As indicated in FIG. 1, the outlets of the conduit 26 to the bearing rings 20a and 20b respectively are provided with throttles which retard a feed and return flow of bearing fluid. That means that, in the event of the piston 14 possibly assuming an inclined position, the gap between the piston and the bearing channel becomes asymmetric, in which case a higher pressure occurs at the narrower location and a lower pressure occurs at the wider location, thus moving the piston back into a vertical position.

In order further to improve the hydrostatic bearing arrangement, each bearing channel 20a and 20b may again be divided into three mutually parallel individual channels or grooves which are respectively fed by way of throttles.

Although a specific form of embodiment of the instant invention has been described above and illustrated in the accompanying drawings in order to be more clearly understood, the above description is made by way of example and not as a limitation to the scope of the instant invention. It is contemplated that various modifications apparent to one of ordinary skill in the art could be made without departing from the scope of the invention which is to be determined by the following claims.

I claim:

1. A pressure standard device, comprising:
   a housing having a generally cylindrical recess with an upper opening and a bottom wall opposite thereto;
   a piston guided with a minimum amount of friction in said cylindrical recess operating by way of at least one of a hydrostatic and aerostatic bearing means;
   a pressure chamber formed between an inner end face of said piston and said bottom wall of said cylindrical recess;
   a conduit means, connected to said pressure chamber, for transmitting an exact pressure prevailing therein, said pressure being precisely defined by loading said piston with calibration weights; and
   a regulating device maintaining said piston in a precisely constant height position independent of varying loading of said piston by selectively feeding or discharging of fluid to and from said pressure chamber.

2. A pressure standard device of claim 1, wherein a weight compensating means is provided for compensating a weight of said piston.

3. A pressure standard device of claim 2, wherein the bearing fluid entering said pressure chamber is removed in a controlled manner.

4. A pressure standard device of claim 3, wherein said pressure chamber communicates by way of a further conduit with a collecting tank into which the bearing fluid passing into said pressure chamber drains and wherein a level of the bearing fluid in said collecting tank is kept constant by draining the bearing fluid in a controlled manner.

5. A pressure standard device of claim 4, wherein a closed supply tank for the bearing fluid is provided, from which the bearing fluid is pumped into said bearing means and into which the bearing fluid removed from said pressure chamber is drained in a controlled manner.

6. A pressure standard device of claim 3, wherein an emptying valve is regulated in respect of its transmission capability by way of a level display means.

7. A pressure standard device of claim 3, wherein a closed supply tank for the bearing fluid is provided, from which the bearing fluid is pumped into said bearing means and into which the bearing fluid removed from said pressure chamber is drained in a controlled manner.

8. A pressure standard device of claim 2, wherein said regulating means has a height-position sensor including a regulating means which is disposed on an output side thereof and which energizes a control member for selectively feeding or discharging of the pressure fluid to and from said conduit.

9. A pressure standard device of claim 1, wherein the bearing fluid entering said pressure chamber is removed in a controlled manner.

10. A pressure standard device of claim 9, wherein said pressure chamber communicates by way of a further conduit with a collecting tank into which the bearing fluid passing into said pressure chamber drains and wherein a level of the bearing fluid in said collecting tank is kept constant by draining the bearing fluid in a controlled manner.

11. A pressure standard device of claim 10, wherein a closed supply tank for the bearing fluid is provided, from which the bearing fluid is pumped into said bearing means and into which the bearing fluid removed from said pressure chamber is drained in a controlled manner.

12. A pressure standard device of claim 10, wherein said regulating means has a height-position sensor including a regulating means which is disposed on an output side thereof and which energizes a control member for selectively feeding or discharging of the pressure fluid to and from said conduit.

13. A pressure standard device of claim 10, wherein a regulated pressure supply device is connected to said conduit for building up an initial pressure.

14. A pressure standard device of claim 9, wherein an emptying valve is regulated in respect of its transmission capability by way of a level display means.

15. A pressure standard device of claim 9, wherein a closed supply tank for the bearing fluid is provided, from which the bearing fluid is pumped into said bearing means and into which the bearing fluid removed from said pressure chamber is drained in a controlled manner.

16. A pressure standard device of claim 15, wherein a regulated pressure supply device is connected to said conduit for building up an initial pressure.

17. A pressure standard device of claim 9, wherein said regulating means has a height-position sensor including a regulating means which is disposed on an output side thereof and which energizes a control member for selectively feeding, or discharging of the pressure fluid to and from said conduit.

18. A pressure standard device of claim 9, wherein a regulated pressure supply device is connected to said conduit for building up an initial pressure.

19. A pressure standard device of claim 1, wherein said conduit projects above said bottom of said cylindrical recess.

20. A pressure standard device of claim 1, wherein said regulating means has a height-position sensor including a regulating means which is disposed on an output side thereof and which energizes a control member for selectively feeding or discharging of the pressure fluid to and from said conduit.

21. A pressure standard device of claim 20, wherein a regulated pressure supply device is connected to said conduit for building up an initial pressure.

22. A pressure standard device of claim 1, wherein a regulated pressure supply device is connected to said conduit for building up an initial pressure.

23. A pressure standard device of claim 1, wherein said bearing means comprise two spaced-apart circular bearing rows which are separated from each other by an annular pocket which is essentially pressure-free.

* * * * *